United States Patent
Lee et al.

(10) Patent No.: US 10,253,834 B2
(45) Date of Patent: Apr. 9, 2019

(54) ELECTROMECHANICAL BRAKE CAPABLE OF DETECTING CHANGE IN MOTOR CHARACTERISTICS

(71) Applicant: Hyundai Motor Company, Seoul (KR)

(72) Inventors: Joung Hee Lee, Gyeonggi-do (KR); Jong Yun Jeong, Gyeonggi-do (KR); Dong Yoon Hyun, Seoul (KR)

(73) Assignee: Hyundai Motor Company, Seoul (KR)

(*) Notice: Subject to any disclaimer, the term of this patent is extended or adjusted under 35 U.S.C. 154(b) by 109 days.

(21) Appl. No.: 15/276,971

(22) Filed: Sep. 27, 2016

(65) Prior Publication Data

US 2017/0321772 A1    Nov. 9, 2017

(30) Foreign Application Priority Data

May 9, 2016  (KR) .................. 10-2016-0056669

(51) Int. Cl.
| | |
|---|---|
| F16D 65/18 | (2006.01) |
| F16D 121/24 | (2012.01) |
| F16D 125/36 | (2012.01) |
| F16D 125/40 | (2012.01) |
| F16D 125/48 | (2012.01) |
| F16D 125/50 | (2012.01) |
| F16D 127/06 | (2012.01) |
| F16D 129/08 | (2012.01) |

(52) U.S. Cl.
CPC .......... *F16D 65/18* (2013.01); *F16D 2121/24* (2013.01); *F16D 2125/36* (2013.01); *F16D 2125/40* (2013.01); *F16D 2125/48* (2013.01); *F16D 2125/50* (2013.01); *F16D 2127/06* (2013.01); *F16D 2129/08* (2013.01)

(58) Field of Classification Search
CPC .. F16D 2121/24; F16D 2127/06; F16D 65/18; F16D 2125/48; F16D 2129/08
See application file for complete search history.

(56) References Cited

U.S. PATENT DOCUMENTS

| | | | | |
|---|---|---|---|---|
| 6,012,556 A | * | 1/2000 | Blosch .................. | F16D 41/206 188/158 |
| 2010/0176653 A1 | * | 7/2010 | Arakawa .................. | B60T 1/10 303/10 |
| 2014/0069751 A1 | * | 3/2014 | Park .................... | F16D 65/0075 188/72.4 |
| 2016/0017942 A1 | * | 1/2016 | Kwon .................... | F16D 65/18 188/162 |
| 2017/0114848 A1 | * | 4/2017 | Park ........................ | B60T 1/005 |

(Continued)

FOREIGN PATENT DOCUMENTS

| | | |
|---|---|---|
| JP | 2008-128363 A | 6/2008 |
| JP | 4756244 B2 | 8/2011 |

(Continued)

*Primary Examiner* — Bradley T King
*Assistant Examiner* — Stephen M Bowes
(74) *Attorney, Agent, or Firm* — Mintz Levin Cohn Ferris Glovsky and Popeo, P.C.; Peter F. Corless

(57) ABSTRACT

An electromechanical brake is configured to detect a change in motor characteristics through a parking mechanism added to an existing electromechanical brake. Particularly, the electromechanical brake controls braking force by predicting a change in motor characteristics even in the event of a breakdown of a force sensor or even in a case in which no force sensor is utilized.

15 Claims, 12 Drawing Sheets

(56) References Cited

U.S. PATENT DOCUMENTS

2017/0182984 A1* 6/2017 Masuda .............. B60T 8/17551
2018/0073584 A1* 3/2018 Tsukamoto ............. F16D 65/14
2018/0135710 A1* 5/2018 Sala ........................ F16D 65/18

FOREIGN PATENT DOCUMENTS

| JP | 5088502 B2 | 12/2012 |
| JP | 5212723 B2 | 6/2013 |
| JP | 2013-249931 A | 12/2013 |
| KR | 100580531 B1 * | 5/2006 |
| KR | 20130020045 A * | 2/2013 |
| KR | 10-1331783 B1 | 11/2013 |
| KR | 2014-0030594 A | 3/2014 |
| KR | 10-1511437 B1 | 4/2015 |

* cited by examiner

ELECTROMECHANICAL BRAKE CAPABLE OF DETECTING CHANGE IN MOTOR CHARACTERISTICS

CROSS-REFERENCE TO RELATED APPLICATION

This application claims under 35 U.S.C. § 119(a) the benefit of Korean Patent Application No. 10-2016-0056669 filed on May 9, 2016, the entire contents of which are incorporated herein by reference.

BACKGROUND

(a) Technical Field

The present invention relates to an electromechanical brake, more particularly, to an electromechanical brake capable of detecting a change in characteristics of a motor for the electromechanical brake.

(b) Description of the Related Art

In general, an electromechanical brake (EMB) has a higher response speed than a hydraulic brake, and may be precisely controlled, and thus the electromechanical brake may improve braking safety performance, and is essentially used for brake-by-wire.

The electromechanical brake produces braking force by operating a motor and mechanically transmitting the rotational force of the motor. The electromechanical brake such as an electric parking brake (EPB) has been widely applied to a vehicle, and its use has been expanded because of the development of the electromechanical brake used for a main brake, which is substituted for a hydraulic brake in the related art. In particular, an electromechanical brake, which integrally implements functions of the electric parking brake, has been developed.

The electromechanical brake is operated by various sensors and electrical devices without being mechanically connected with a driver, and it is necessarily required to ensure stability against a breakdown of such devices.

For example, the electromechanical brake in the related art is provided with a force sensor in order to control braking force. However, the electromechanical brake including the force sensor has problems in that the force sensor is expensive, and in the event of a breakdown of the force sensor, it is impossible to control braking force because a change in motor characteristics cannot be predicted.

The above information disclosed in this Background section is only for enhancement of understanding of the background of the invention and therefore it may contain information that does not form the prior art that is already known in this country to a person of ordinary skill in the art.

SUMMARY

The present invention provides an electromechanical brake capable of controlling braking force by predicting a change in motor characteristics even in the event of a breakdown of a force sensor or even in a case in which no force sensor is utilized.

In one aspect, the present invention provides an electromechanical brake configured to detect a change in motor characteristics, the electromechanical brake including: a motor unit which rotates a driving shaft; a braking unit which produces braking force or cuts off the braking force in accordance with the rotation of the driving shaft; a parking drive unit which operates a driving rod; a parking ring which is freely and rotatably installed on the driving shaft and has catching portions formed radially; a rotatable member which is installed on the driving shaft so as to be rotatable alone or together with the parking ring in accordance with the rotation of the driving shaft; and an elastic body which is elastically deformed in accordance with a relative displacement difference between the rotatable member and the parking ring.

In a preferred embodiment, the rotatable member may have a protruding portion that protrudes radially, a restricting portion may be formed on one surface of the parking ring along a movement trajectory of the protruding portion on the rotatable member, and the parking ring and the rotatable member may be rotated together when the protruding portion presses the restricting portion.

In another preferred embodiment, the parking ring may be installed on the driving shaft below the rotatable member, and the restricting portion may have an arc shape protruding from an upper surface of the parking ring.

In still another preferred embodiment, the protruding portion may be configured as a pair of protruding portions that face each other, the restricting portion may be configured as a pair of restricting portions that face each other, and the protruding portions may be configured to be moved between the pair of restricting portions in accordance with the rotation of the rotatable member.

In yet another preferred embodiment, one end portion of the elastic body may be fixed to the parking ring, and another end portion of the elastic body may be fixed to the rotatable member, such that a relative displacement difference occurs between the parking ring and the rotatable member.

In still yet another preferred embodiment, the elastic body may be a torsion spring.

In a further preferred embodiment, one end portion of the elastic body may be fixed to the protruding portion, another end portion of the elastic body may be fixed to the restricting portion, and the elastic body may be elastically deformed due to a relative displacement difference that occurs when the protruding portion is moved between the pair of restricting portions.

In another further preferred embodiment, the driving rod may move to restrict the rotation of the parking ring while coming into contact with the catching portions of the parking ring, and the rotatable member may elastically deform the elastic body while rotating alone in a state in which the rotation of the parking ring is restricted.

In still another further preferred embodiment, the elastic body may be fixed to the rotatable member and the parking ring in a state in which the elastic body is in a no-load state or a compressed state.

In yet another further preferred embodiment, the electromechanical brake may further include a sensor unit which detects a rotation angle and motor electric current of the motor unit.

In still yet another further preferred embodiment, the electromechanical brake may further include a control unit which determines a motor torque constant corrected based on the rotation angle and the motor electric current detected by the sensor unit.

In a still further preferred embodiment, the catching portions may be protrusions formed radially.

In a yet still further preferred embodiment, the protrusion may have a serrated shape having a first surface and a second surface, and the first surface may have a smaller area than the second surface.

In a yet still further preferred embodiment, the catching portions may have the same shape and size.

In a yet still further preferred embodiment, the electromechanical brake may further include: a parking rod which is hingedly coupled to the driving rod and has a slot; and a guide pin which is inserted into the slot of the parking rod and fixed to a housing.

In a yet still further preferred embodiment, the slot may have a track shape, the guide pin may have a circular cross section, and a width of the slot may be set such that the guide pin is not moved in a width direction.

In a yet still further preferred embodiment, the electromechanical brake may further include: a driving gear which is installed on the driving shaft; and a reduction gear unit which is connected with the driving gear.

In a yet still further preferred embodiment, the electromechanical brake may further include: a driving gear which is installed on the driving shaft; and a driven gear which is connected with the driving gear, in which the parking ring, the rotatable member, and the elastic body are installed on a shaft of the driven gear.

According to the present invention, it is possible to omit an expensive force sensor, thereby reducing manufacturing costs of the electromechanical brake.

It is also possible to check that clamping force of the electromechanical brake is erroneously detected, and as a result, it is possible to detect abnormality of the sensor, thereby improving system durability.

In the case of the electromechanical brake including a force sensor, it is possible to control braking force even in the event of a breakdown of the force sensor, thereby improving stability against a breakdown.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIGS. 6A and 6B are graphs illustrating a relationship between a motor rotation angle and a motor electric current, in which FIG. 6A illustrates an initial state in which a spring is not compressed, and FIG. 6B illustrates an initial state in which a spring is compressed;

Figure 1:
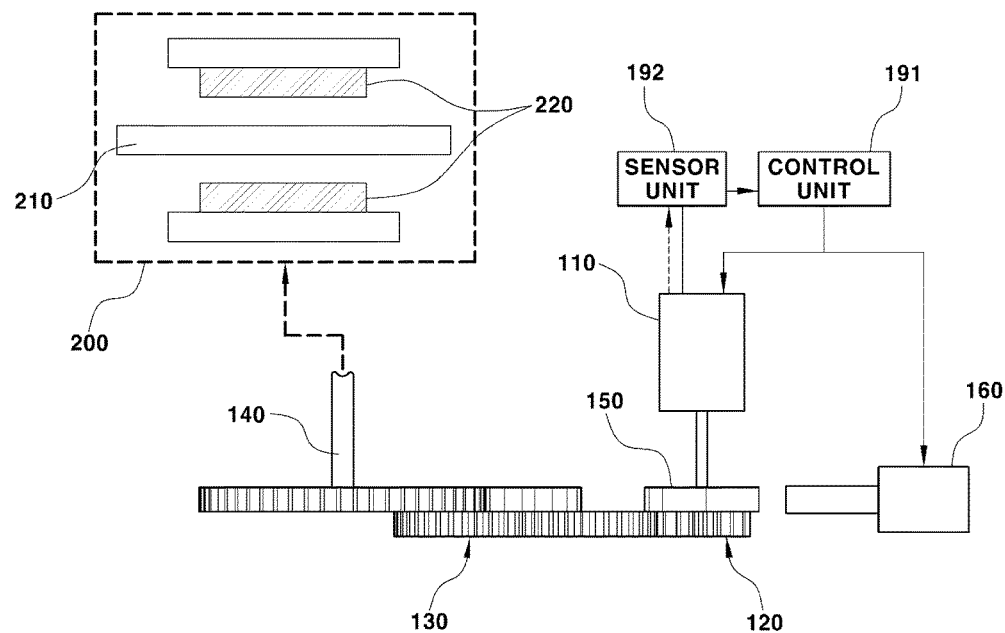
FIG. 1 is a view schematically illustrating an entire configuration of an electromechanical brake according to an exemplary embodiment of the present invention.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides an electromechanical brake which is provided with a parking mechanism and configured to estimate motor characteristics based on a change in electric current when a spring included in the parking mechanism is compressed. In the present invention, the parking mechanism means a mechanism which is added such that the electromechanical brake may function as an electric parking brake (EPB). Therefore, the parking mechanism according to the present invention excludes typical components of the electromechanical brake such as a motor, and a reduction gear unit, but includes a parking ring, a parking rod, and the like which will be described below. Further, the parking mechanism according to the present invention includes an elastic body such as a spring in order to estimate motor characteristics.

Hereinafter, an electromechanical brake capable of detecting a change in motor characteristics according to an exemplary embodiment of the present invention will be described in detail with reference to the accompanying drawings.

FIG. 1 is a view schematically illustrating an entire configuration of the electromechanical brake according to the exemplary embodiment of the present invention.

As shown in FIG. 1, the electromechanical brake according to the exemplary embodiment of the present invention includes a motor unit 110, a driving gear 120 which is connected to a driving shaft of the motor unit 110, a reduction gear unit 130 which is connected to the driving gear 120, and a braking unit 200 which is operated by a spindle 140 connected to the reduction gear unit 130. All or at least some of these components may be mounted in a housing 300.

Specifically, the present exemplary embodiment includes the motor unit 110 for providing braking force for braking a vehicle, and a parking drive unit 160 which is operated to support braking force at the time of parking the vehicle. In addition, the motor unit 110 and the parking drive unit 160 are operated by an operation command from a control unit 191. In the present invention, the motor unit 110 may be configured to be rotatable in two directions in order to provide braking force and eliminate braking force. Meanwhile, the parking drive unit 160 according to the present invention may be configured to provide unidirectional or bidirectional driving power. The driving power provided by the parking drive unit 160 moves a driving rod 161.

The motor unit 110 is configured to be operated by being supplied with electric power from a driving power source such as a battery in accordance with an operation command from the control unit 191. The driving gear 120 is mounted on the driving shaft of the motor unit 110, and the driving gear 120 is configured to transmit rotational force, which is provided by the motor unit 110, to the spindle 140 for operating the braking unit 200. In particular, the driving gear 120 is connected to the reduction gear unit 130, and rotational force of the motor unit 110 is transmitted through the reduction gear unit 130, such that the spindle 140 is rotated. The reduction gear unit 130 is a component for slowing down the rotation of the driving shaft by the drive motor to an appropriate level, and may be configured by combining a plurality of gears.

The spindle 140 rotates to allow the braking unit 200 to produce braking force, and particularly, the spindle 140 may be configured in the form of a ball screw or a typical screw. The braking unit 200 includes brake pads 220 and a disc 210, and is configured such that a movable member (not shown) thread-coupled to the spindle 140 presses the brake pads 220 against the disc 210 while moving.

According to a braking operation of the electromechanical brake according to the present invention, at the time of braking the vehicle, when the control unit 191 receives a driver's intention of braking the vehicle, the control unit 191 allows the driving power source such as a battery to apply electric power to the motor unit 110, such that the motor is operated, and the braking operation is started. When electric power is applied to the motor unit 110 and the driving shaft is rotated in a forward direction, the driving gear 120 connected to the motor unit 110 is operated, and rotates the spindle 140 via the reduction gear unit 130.

The rotational motion of the spindle 140 is converted into the rectilinear motion through a structure such as a ball screw, and thus the brake pads 220 press the disc 210 so as to perform the braking operation.

Meanwhile, at the time of stopping the braking operation, the motor unit 110 is rotated in a reverse direction opposite to the aforementioned forward direction. For example, on the assumption that the forward direction is a clockwise direction, the driving shaft is rotated counterclockwise so as to stop the braking operation.

At the time of stopping the braking operation, the same process of transmitting driving power of the motor to the braking unit 200 via the spindle 140 is carried out, but because the motor is rotated in the opposite direction, the brake pads 220 do not press the disc 210, but move in a direction in which the braking force is released, that is, a direction in which the brake pads 220 move away from the disc 210.

The present invention may be configured to further include a sensor unit 192 for detecting a rotation angle and a motor electric current of the motor unit. In this case, the control unit is used to determine a motor torque constant which is corrected by detecting a change in motor characteristics. In particular, the control unit may be configured to determine a motor torque constant which is corrected based on the rotation angle and the motor electric current detected by the sensor unit 192.

Meanwhile, a configuration and an operation of an electromechanical brake according to a first exemplary embodiment of the present invention for detecting a change in motor characteristics will be described with reference to FIGS. 2 to 4.

Figure 2A:
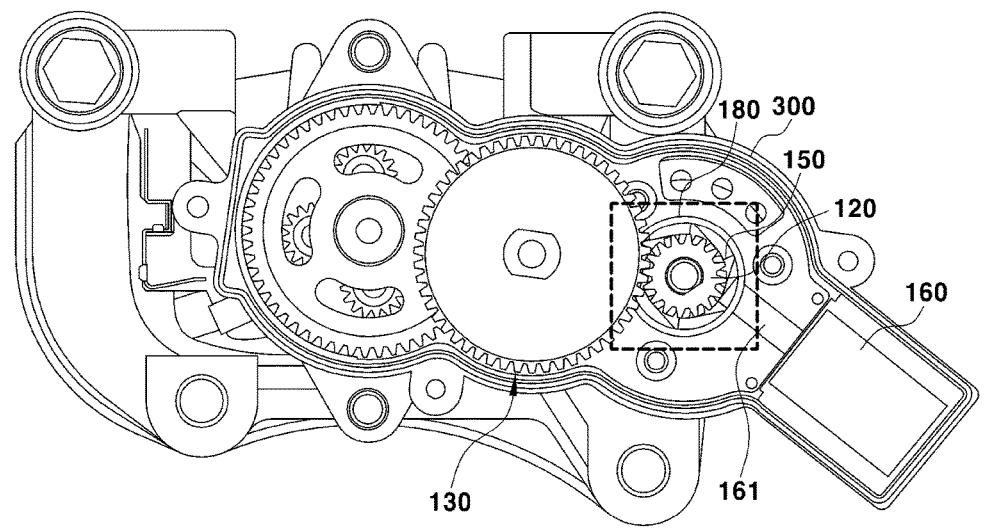
FIGS. 2A and 2B are views illustrating internal components of an electromechanical brake according to a first exemplary embodiment of the present invention.
Figure 2B:
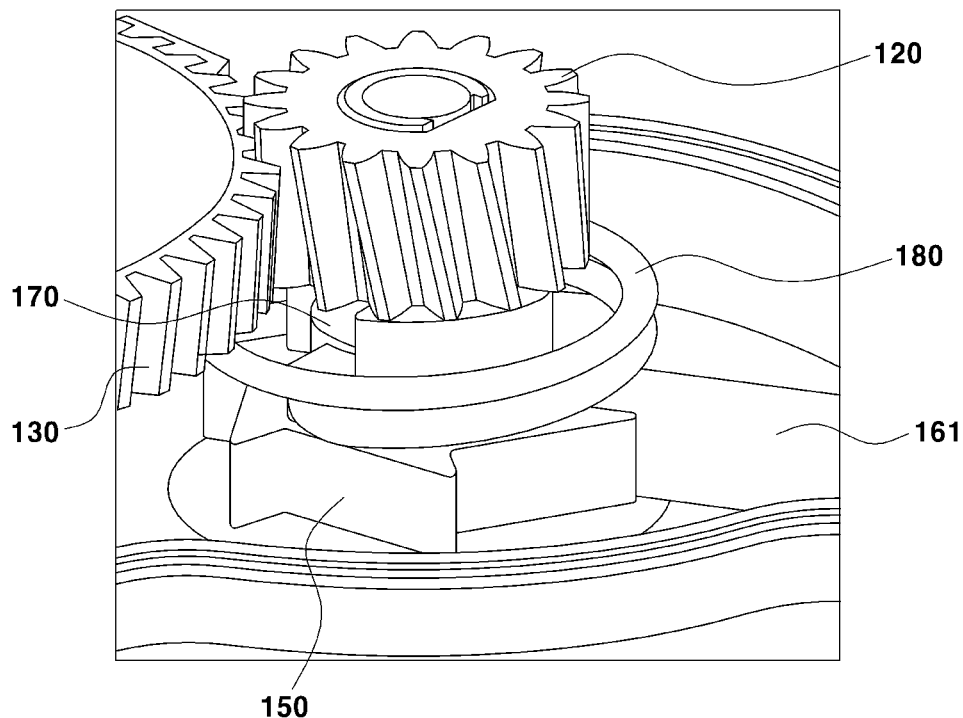

FIG. 2A is a view illustrating internal components of the electromechanical brake according to the exemplary embodiment of the present invention, and FIG. 2B is a view illustrating the parking mechanism of which the portion illustrated in FIG. 2A is enlarged. FIGS. 3A to 3E illustrate states in which the parking mechanism according to the present exemplary embodiment is operated.

The electromechanical brake according to the first exemplary embodiment of the present invention has a structure in which rotation of a parking ring 150 connected to the driving shaft of the motor may be inhibited by the parking drive unit 160 which is operated in two directions.

As shown in FIG. 2A, the driving gear 120 and the reduction gear unit 130 are accommodated in the housing 300. The driving gear 120 is mounted on the driving shaft of the motor unit 110, and the parking ring 150 and a rotatable member 170 are installed on the driving shaft.

The parking ring 150 has a structure in which the rotation of the parking ring 150 may be restricted by the driving rod 161 of the parking drive unit 160.

The parking drive unit 160 is configured to perform the braking operation for parking the vehicle and stop the braking operation, and may be configured as a bidirectional solenoid that may operate the driving rod 161 in two directions. The solenoid is used to move the driving rod 161 so as to maintain the applied braking force and prevent the braking force from being eliminated. Therefore, the solenoid includes the driving rod 161 which moves in the two directions by being supplied with electric power. In particular, according to the first exemplary embodiment, the driving rod is moved in a direction as shown in FIG. 4B at the time of parking the vehicle, and the driving rod is moved in the opposite direction at the time of releasing a parking brake.

The parking ring 150 is installed to be freely rotatable on the driving shaft of the motor. In contrast, the rotatable member 170 is configured to be rotated together with the driving shaft of the motor, and configured to be able to transmit driving power of the motor to the parking ring 150. The position where the parking ring 150 is mounted in an example shown in FIG. 2B is one preferred example, and the position is not particularly limited as long as the parking ring 150 is rotatably mounted on the driving shaft of the motor unit. Therefore, the rotatable member 170 is installed to be rotatable alone or together with the parking ring 150 when the driving shaft is rotated.

Figure 3A:
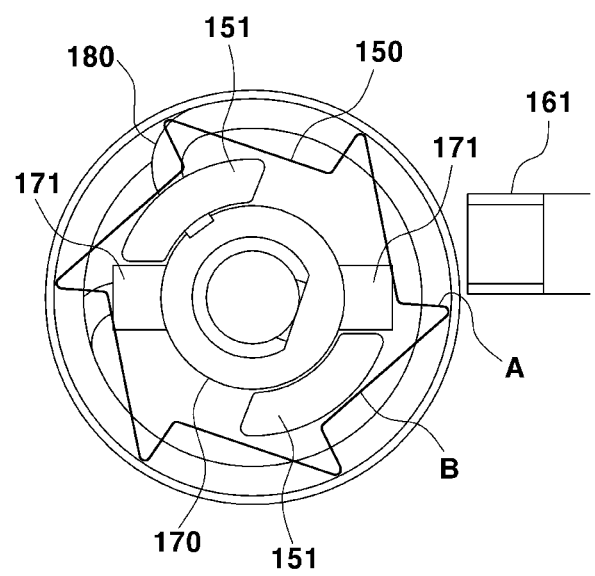
FIGS. 3A to 3E are views illustrating operations of the internal components of the electromechanical brake according to the first exemplary embodiment of the present invention.

As shown in FIG. 3A, according to the specific structure in the parking mechanism, protruding portions 171, which protrude radially, are formed on the rotatable member 170, and restricting portions 151 are formed on one surface of the parking ring 150 along a movement trajectory of the protruding portions 171 on the rotatable member 170.

Therefore, the parking ring 150 is not rotated by being synchronized with the rotation of the driving shaft of the motor, but may be selectively rotated only when the protruding portions 171 come into contact with the restricting portions 151 and the parking ring 150 may receive rotational force. Therefore, when the protruding portions 171 on the rotatable member 170 press the restricting portions 151 of the parking ring 150, the parking ring 150 and the rotatable member 170 are rotated together.

An elastic body is installed on the parking ring 150 and the rotatable member 170. One end portion of the elastic body is fixed to the parking ring 150, and another end portion of the elastic body is fixed to the rotatable member 170. Therefore, the elastic body stores a difference in relative rotational displacement between the rotatable member 170 and the parking ring 150 as elastic force. In particular, the elastic body may be a torsion spring 180, one end of the torsion spring 180 may be fixed to the restricting portion 151 of the parking ring 150, and another end of the torsion spring 180 may be fixed to the protruding portion 171 of the rotatable member 170. Thus, when relative displacement occurs between the rotatable member 170 and the parking ring 150, for example, when only the rotatable member 170 is rotated while the parking ring 150 is not rotated, torsional displacement occurs as the torsion spring 180 is pressed.

For example, the parking ring 150 is installed on the driving shaft below the rotatable member 170, and the restricting portion 151 may have an arc shape that protrudes from an upper surface of the parking ring 150.

The protruding portions 171 may be configured as a pair of protruding portions 171 that face each other, and the restricting portions 151 may be configured as a pair of restricting portions 151 that face each other. In this case, the protruding portions 171 are moved between the pair of restricting portions 151 when the rotatable member 170 is rotated, and during this process, the elastic body is compressed.

That is, in the present exemplary embodiment, when the driving rod restricts the rotation of the parking ring 150 while coming into contact with a catching portion of the parking ring 150, the rotatable member 170 causes a rotational displacement difference from the parking ring 150 while rotating alone, thereby elastically deforming the elastic body.

Meanwhile, in the present exemplary embodiment, the torsion spring 180 serves to transmit rotational force of the rotatable member 170 to the parking ring 150. That is, in a case in which the torsion spring 180 is set in a no-load state (normal setting in which the spring is not compressed) or in a compressed state (setting in which the spring is compressed in an initial state), the parking ring 150 and the rotatable member 170 are rotated together because the parking ring 150 is connected with the rotatable member 170 through the torsion spring 180.

Figure 3B:
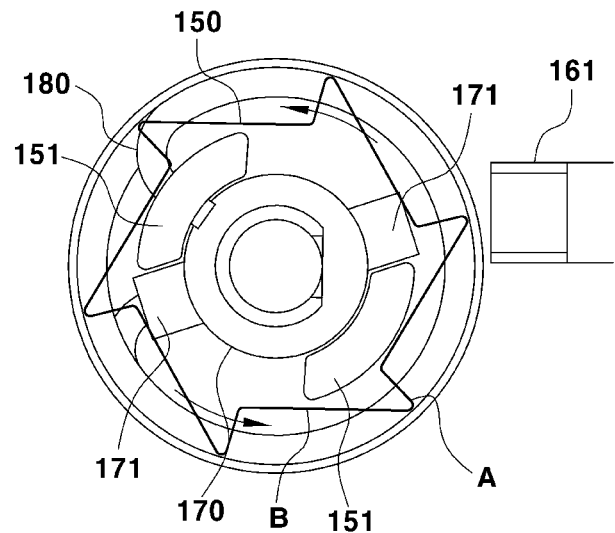

For example, when the driving shaft is rotated counterclockwise in an initial state as shown in FIG. 3A, the parking ring 150 is also rotated together with the rotatable member 170 as shown in FIG. 3B.

Figure 3C:
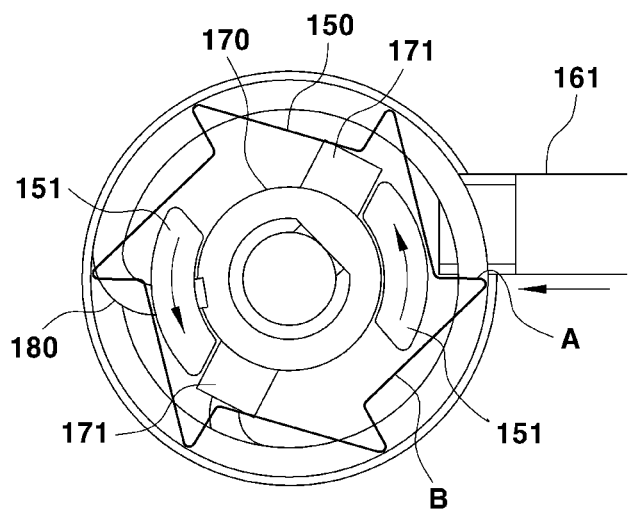
Figure 3D:
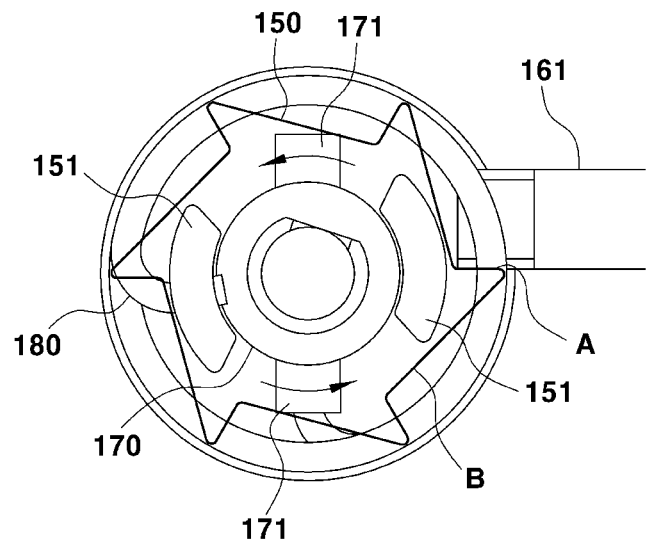
Figure 3E:
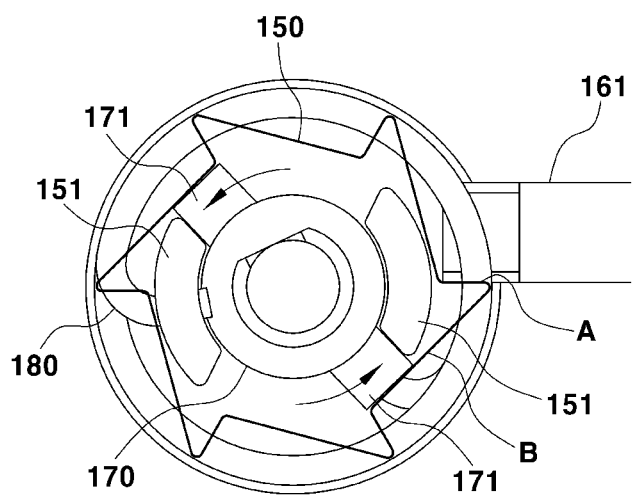

In contrast, in a case in which the driving rod restricts the rotation of the parking ring 150 as shown in FIG. 3C, the parking ring 150 is not rotated, but only the rotatable member 170 is rotated as shown in FIG. 3D. As the rotatable member 170 is rotated, the parking ring 150 and the rotatable member 170 move relative to each other, and the torsion spring 180 is compressed. The rotatable member 170 is rotated until the protruding portion 171 comes into contact with the restricting portion 151 of the parking ring 150 (FIG. 3E).

An initial state is set which includes a relative position relationship among the rotatable member 170, the parking ring 150, and the torsion spring 180. In this initial state, the restricting portion 151 of the parking ring 150 and the protruding portion 171 of the rotatable member 170 may be set to be in contact with each other, and the torsion spring 180 may be set in the no-load state or the compressed state.

Meanwhile, the parking ring 150, which is operated in conjunction with the driving rod 161, has a catching structure in which the driving rod 161 may come into contact with the parking ring 150 so as to restrict the rotation of the driving shaft. Therefore, in the present invention, the parking ring 150 may be variously implemented as long as the parking ring 150 has a structure that may be caught by the driving rod 161 so as to restrict the rotation. For example, the parking ring 150 may be structured to have a circular body with a groove formed therein, and particularly, may be structured to have outwardly protruding protrusions as shown in FIG. 2.

In the present specification, the catching structure of the parking ring 150 is referred to collectively as a catching portion, and hereinafter, an example in which the catching portion is implemented in the form of a protrusion will be described.

The parking ring 150 provided with a plurality of protrusions is mounted on the driving shaft. The parking ring 150 is rotated together with the driving shaft of the motor unit 110. The protrusions of the parking ring 150 are radially disposed on a ring-shaped circular body, and particularly, configured as a plurality of protrusions having the same size and shape which covers regions equally divided, respectively.

According to the exemplary embodiment of the present invention, the protrusion has a first surface A having a relatively small area, and a second surface B having a relatively large area. The first surface A is a surface approximately directed toward a center of the parking ring 150, and the second surface B defines a surface that abuts on the circular body of the parking ring 150. Therefore, as shown in FIGS. 2B and 3A, the protrusions have a plurality of serrated structures radially disposed on the circular body. Meanwhile, in FIG. 1, the parking ring 150 is illustrated as being mounted at a lower side of the driving gear 120, that is, at a side close to the motor, but a relative mounting position may be changed.

According to the exemplary embodiment of the present invention, the parking ring, the rotatable member, and the elastic body are sequentially connected on the driving shaft connected to the motor as shown in FIGS. 2A and 2B, but the present invention is not limited by the exemplary embodiment. For example, another exemplary embodiment of the present invention may be configured to further include a driving gear installed on the driving shaft, and a driven gear connected with the driving gear, and the parking ring, the rotatable member, and the elastic body may be installed on a shaft of the driven gear.

FIGS. 4A to 4D depict states in which the parking mechanism according to the first exemplary embodiment of the present invention is operated at the time of parking the vehicle.

Although not shown in the drawings, since sufficient braking force needs to be produced between the disc 210 and the pads in order to perform the parking braking, it is based upon the premise that the motor unit 110 is being operated by the control unit 191.

Figure 4A:
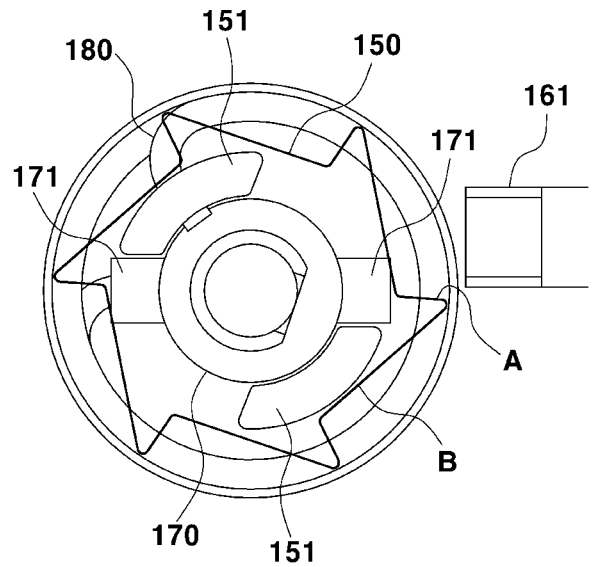
FIGS. 4A to 4D are views sequentially illustrating states in which the electromechanical brake according to the first exemplary embodiment of the present invention is operated at the time of parking a vehicle.
Figure 4B:
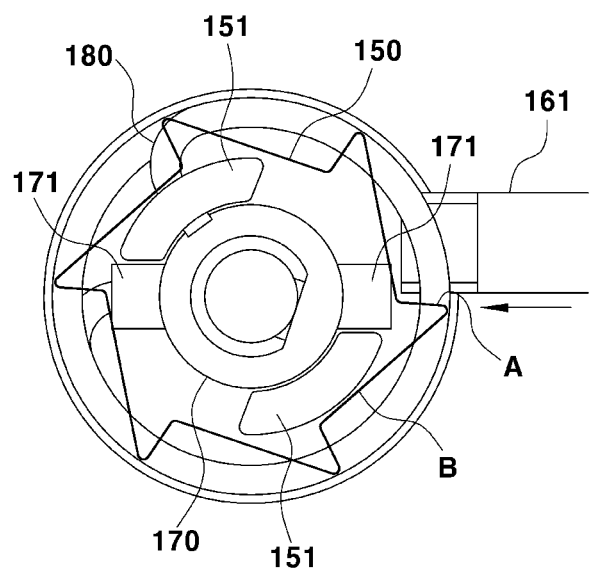

As shown in FIG. 4A, in a state in which the parking braking is not performed, the driving rod 161 is positioned so as not to restrict the parking ring 150.

Next, when the control unit 191 operates the parking drive unit 160 (i.e., solenoid), the driving rod 161 moves forward as shown in FIG. 4B.

As the driving rod 161 moves forward, the driving rod 161 moves to a position sufficient for restricting the parking ring 150 as shown in FIG. 4B.

In this case, as shown in FIG. 4B, the parking ring 150 is required to be rotated in order to compensate for a clearance between the protrusion of the parking ring 150 and the driving rod 161.

Figure 4C:
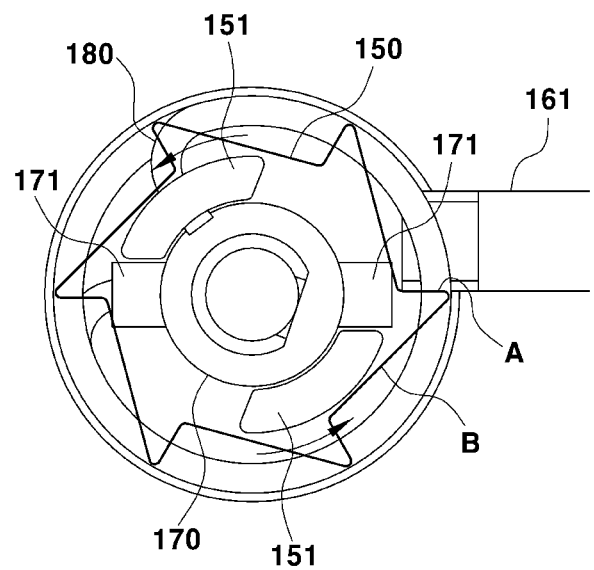
Figure 4D:
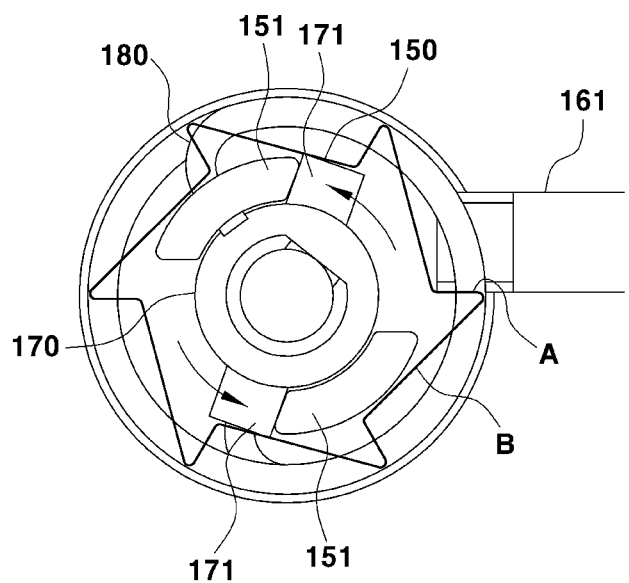

Because braking reaction force is applied due to clamping force at the time of the parking braking, the rotatable member 170 and the parking ring 150 come into contact with the driving rod while rotating in a case in which motor driving power for producing braking force is cut off (FIG. 4C). However, on the contrary, the motor unit may be rotated in a direction for reducing pressure (i.e., counterclockwise in FIG. 4C).

Therefore, the driving rod 161 restricts the rotation of the parking ring 150, such that the parking braking is completed (FIG. 4C).

Figure 5A:
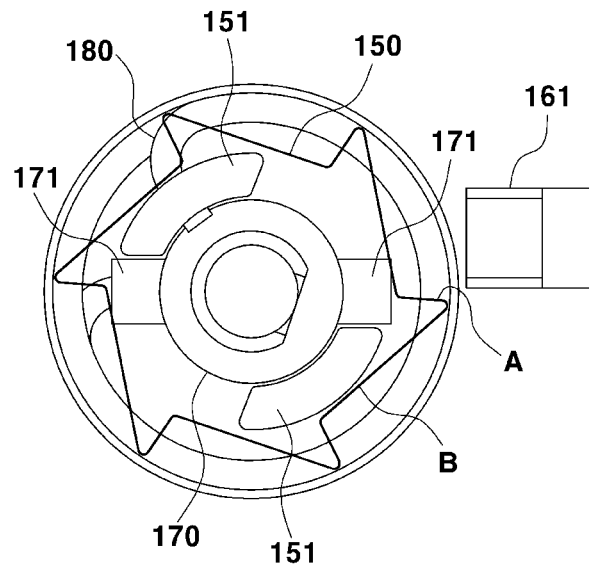
FIGS. 5A to 5C are views sequentially illustrating states in which the electromechanical brake according to the first exemplary embodiment of the present invention is operated in accordance with a mode for estimating motor characteristics.

Meanwhile, a process of estimating motor characteristics will be described with reference to FIGS. 5A to 5C. The process of estimating motor characteristics is similar to the parking braking process.

However, because the process of producing braking force at the time of parking braking is not required during the process of estimating motor characteristics, the process of estimating motor characteristics may be performed in a state in which the braking operation is stopped and braking reaction force is not formed. Therefore, an initial state shown in FIG. 5A is identical to the state shown in FIG. 4A except that there is no braking reaction force. However, whether to produce braking reaction force may not be essential.

Figure 5B:
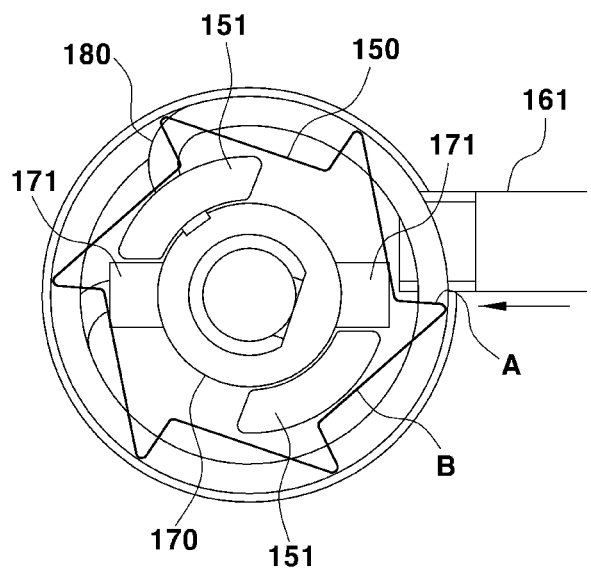

Next, as shown in FIG. 5B, the driving rod 161 moves forward to a position sufficient for restricting the parking ring 150.

Figure 5C:
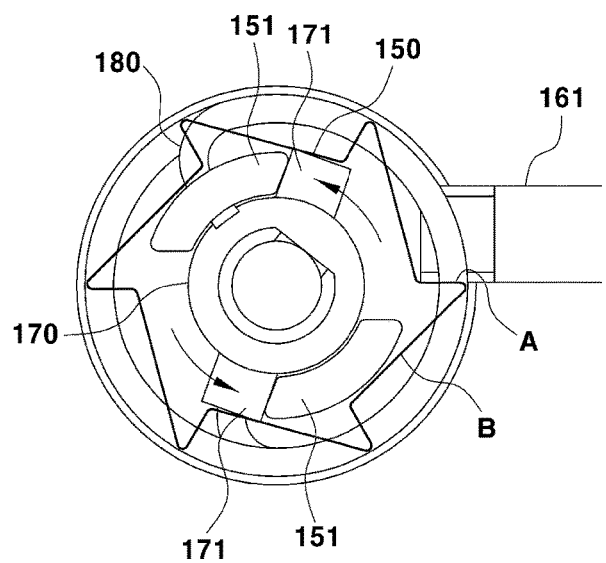

If the driving rod sufficiently moves forward, the driving rod and the parking ring 150 come into contact with each other by operating the motor, such that the rotation of the parking ring 150 is restricted (FIG. 5C).

When the rotation of the parking ring 150 is restricted, only the rotatable member 170 is rotated by the motor unit, and as a result, relative displacement occurs between the rotatable member 170 and the parking ring 150. Because of the relative displacement, the torsion spring 180 is compressed.

During a process in which the torsion spring 180 is compressed, motor characteristics may be estimated by detecting a motor rotation angle and electric current applied to the motor. Here, the motor characteristics are determined by a relationship between the motor rotation angle and the motor electric current, which are monitored during the process in which the spring is compressed.

Figure 6A:
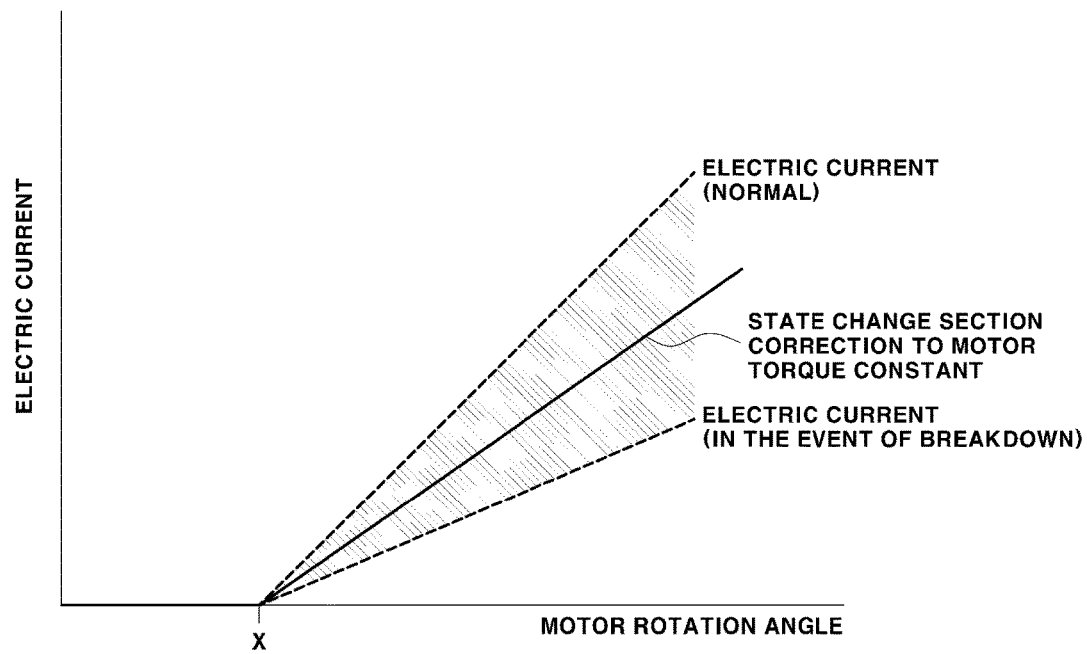
Figure 6B:
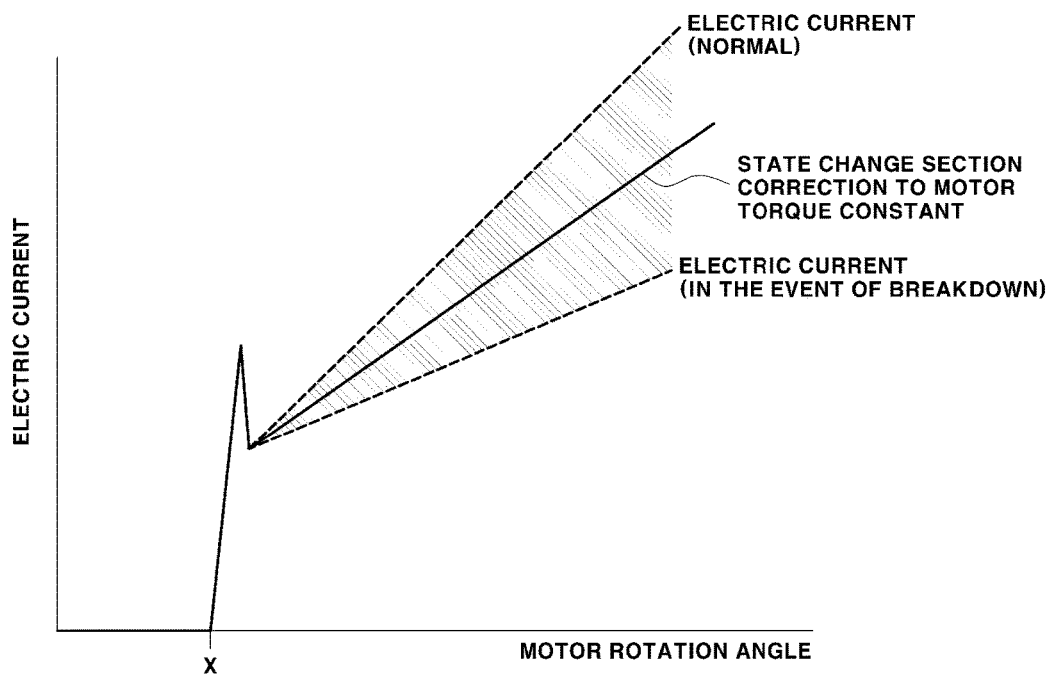

FIGS. 6A and 6B are graphs illustrating a relationship between the motor rotation angle and the motor electric current, in which FIG. 6A illustrates an initial state in which a spring is set not to be compressed, and FIG. 6B illustrates an initial state in which a spring is set to be compressed.

Referring to FIG. 6A, after the driving rod and the parking ring come into contact with each other, the electric current, which is applied to press the spring, is increased. Therefore, as shown in FIG. 6A, the motor electric current is also increased as the motor rotation angle is increased, gradients of straight lines, which indicate the tendency of increase, are determined depending on a spring constant of the torsion spring 180.

In FIG. 6A, the uppermost straight line means an initial normal state, the lowermost straight line means a state in which the motor is not normally operated and the motor breaks down. Meanwhile, the motor characteristics are changed as durability of the motor is changed, and a gradient of the straight line is changed as the motor characteristics are changed.

Therefore, a state is changed as indicated by the intermediate straight line illustrated in FIG. 6A, and a change in motor characteristics may be predicted in consideration of the state change, and the motor torque constant may be corrected. The correction to the motor torque constant may be implemented by presetting a correction value in accordance with a change in gradient, and applying the preset correction value. If the motor torque constant may be periodically corrected in accordance with a change in motor characteristics, accurate braking force may be calculated, and thus the force sensor may be removed or a breakdown of the force sensor may be addressed.

Meanwhile, FIG. 6B illustrates a state in which the spring is set to be compressed, and the state illustrated in FIG. 6B is identical to a state illustrated in FIG. 6A except that because the spring is compressed in an initial state, additional electric current is required to compress the spring by overcoming the compressed state of the spring when the parking ring and the driving rod come into contact with each other (a region in FIG. 6B in which electric current is rapidly increased). The additional electric current for overcoming the compressed state is indicated by a portion in the graph of FIG. 6B in which the electric current is rapidly increased.

Therefore, according to the present exemplary embodiment, a change in motor characteristics may be estimated by monitoring a change in motor rotation angle and a change in motor electric current while the spring is compressed from a point X at which the driving rod and the parking ring come into contact with each other (i.e., to a point in time at which the rotation of the rotatable member 170 is restricted by the restricting portion 151 of the parking ring), and the motor torque constant may be corrected by using the change in motor rotation angle and the change in motor electric current.

Figure 7A:
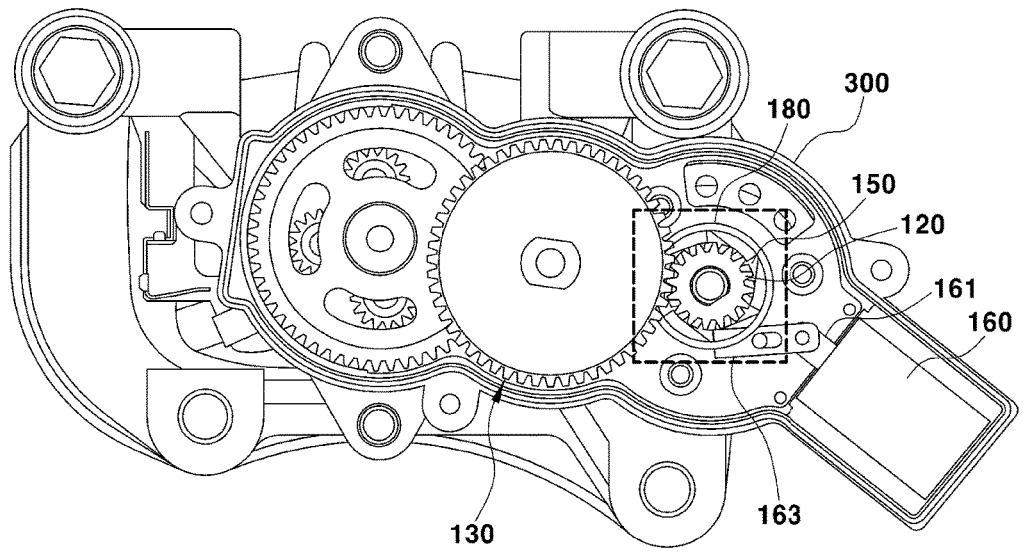
FIGS. 7A and 7B are views illustrating internal components of an electromechanical brake according to a second exemplary embodiment of the present invention.
Figure 7B:
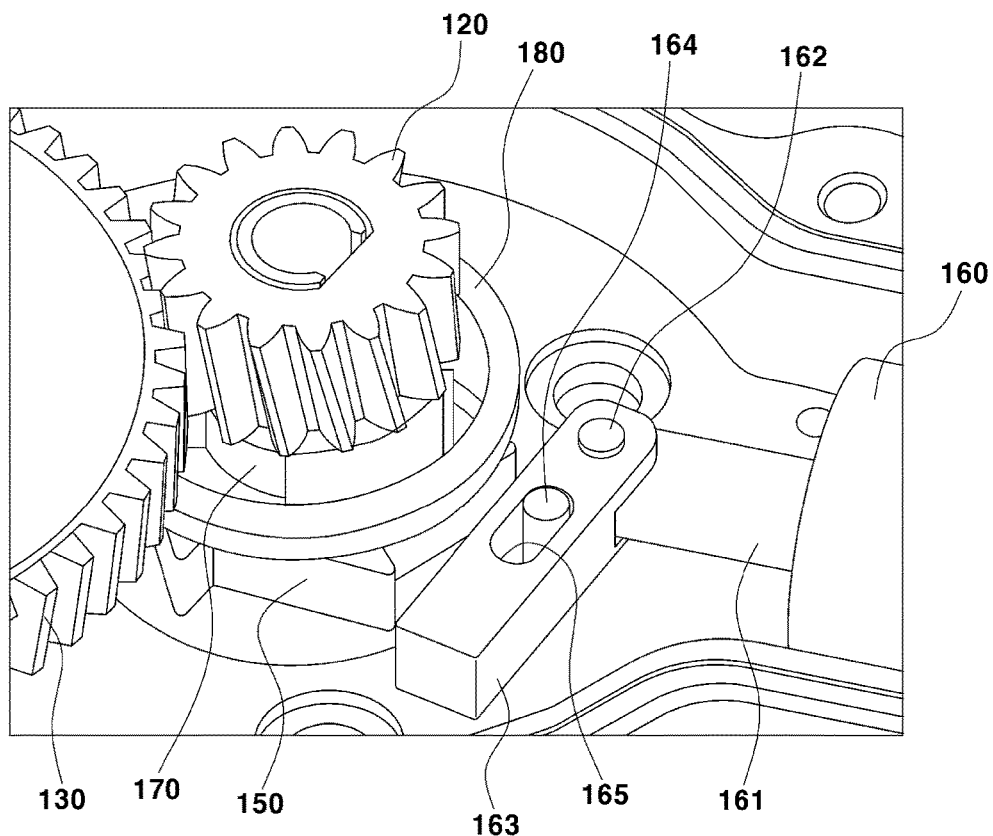
Figure 8A:
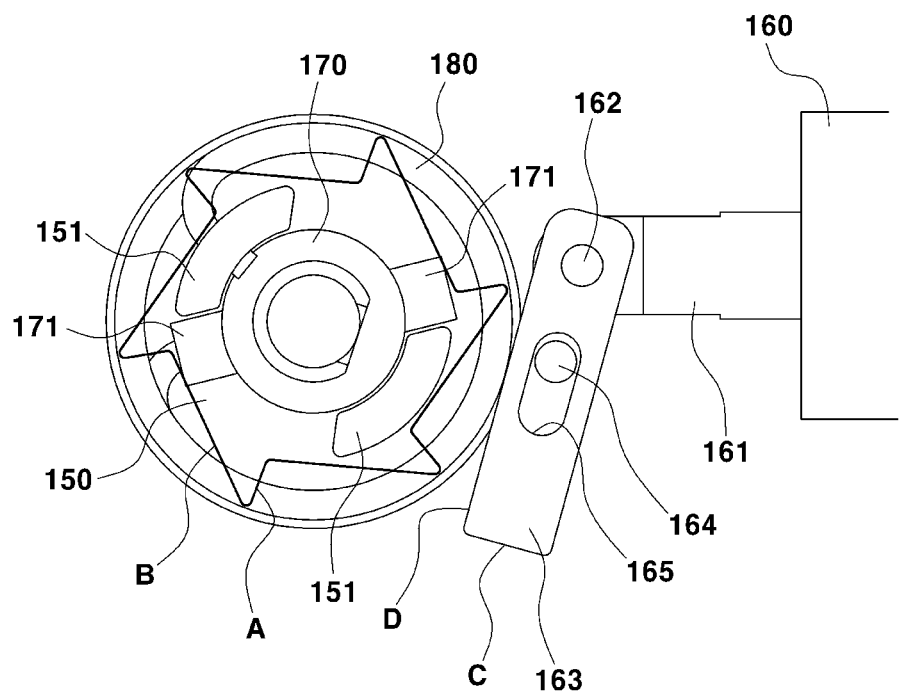
FIGS. 8A to 8C are views illustrating states in which the electromechanical brake according to the second exemplary embodiment of the present invention is operated in accordance with a mode for estimating motor characteristics.
Figure 8B:
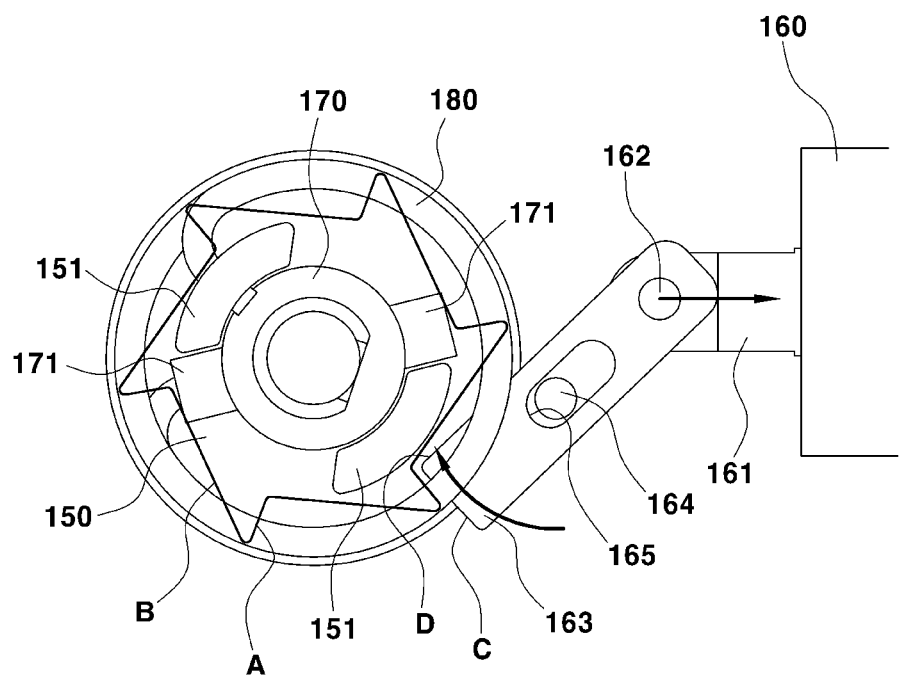
Figure 8C:
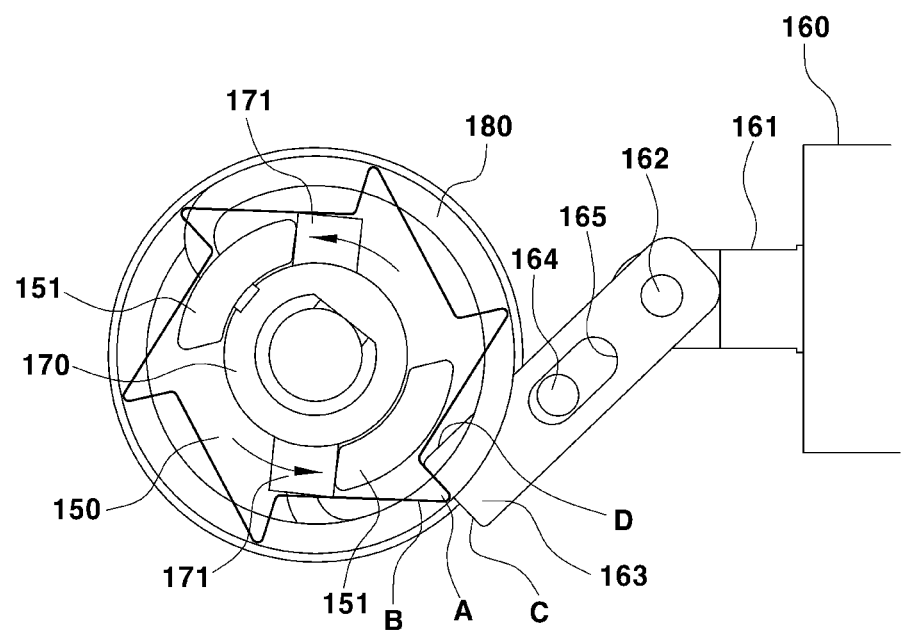

FIGS. 7A and 7B are views illustrating internal components of an electromechanical brake according to a second exemplary embodiment of the present invention, and FIGS. 8A to 8C are views illustrating states in which the electromechanical brake according to the second exemplary embodiment of the present invention is operated in accordance with a mode for estimating motor characteristics.

The second exemplary embodiment is identical to the first exemplary embodiment except that the second exemplary embodiment further includes a parking rod 163 hingedly coupled to the driving rod 161.

In the present exemplary embodiment, the parking drive unit 160 may be configured as a unidirectional solenoid that may operate the driving rod 161 in a single direction. The solenoid includes the driving rod 161 which is moved in a single direction by being supplied with electric power, and particularly, further includes a return spring for providing restoring force for allowing the driving rod 161 to return to an initial position. In particular, according to the exemplary embodiment of the present invention, parking may be released just by the movement of the motor unit 110 for stopping the braking operation, that is, by rotating the motor unit 110 in a direction for reducing pressure without applying separate force for releasing the parking braking. Therefore, when the motor unit 110 is rotated in the direction for reducing pressure, the parking rod 163 and the driving rod 161 may be automatically moved to a position for releasing braking by using restoring force of the return spring.

The parking rod 163 is hingedly coupled to the driving rod 161 by means of a hinge portion 162, and has a slot 165 formed at a center thereof. Meanwhile, a guide pin 164 is formed on a bottom surface of the housing 300 or other members to which the guide pin 164 may be fixed, and the guide pin 164 is inserted into the slot 165. When the parking drive unit 160 is operated, the parking rod 163 comes into contact with the parking ring 150 so as to restrict the rotation of the parking ring 150, and the guide pin 164 is inserted into the slot 165 so as to guide the movement of the parking rod 163.

The slot 165 has a sufficiently larger size than the guide pin 164 so that the guide pin 164 may be moved in the slot 165. In particular, the guide pin 164 has a circular cross section, and the slot 165 is configured to have a track shape having a width approximately identical to a diameter of the guide pin 164 (actually a width slightly larger than a diameter of the guide pin 164). Here, a width of the track shape means a portion having a relatively short width. The track-shaped slot 165 has a size sufficient to receive the movement of the driving rod 161, and the driving rod 161 may be operated once as the guide pin 164 is positioned at both end portions in a longitudinal direction of the slot 165.

That is, as shown in FIGS. 8A to 8C, when the driving rod 161 is at a parking braking releasing position (at a point where the driving rod 161 is extended farthest from the solenoid) (FIG. 3A), the guide pin 164 is positioned at a first end portion in the longitudinal direction of the slot 165, and when the driving rod 161 is at a parking braking position (at a point where the driving rod 161 is retracted closest to the solenoid) (FIG. 3C), the guide pin 164 is positioned at a second end portion in the longitudinal direction of the slot 165.

The parking rod 163 needs to be formed to restrict the rotation of the parking ring 150. To this end, the parking rod 163 has an upper end surface C which comes into contact with the protrusion of the parking ring 150 so as to support the parking ring 150. The upper end surface C may be formed as a quadrangular flat structure.

The parking rod 163 is configured to move to a releasing position by being pushed by the protrusion of the parking ring 150 at the time of releasing the parking. To this end, the parking rod 163 has a lateral surface D which extends from one end portion of the upper end surface C so that the parking rod 163 may be pushed away while coming into contact with the protrusion of the parking ring 150. Like the upper end surface C, the lateral surface D may also include a quadrangular flat structure.

Meanwhile, the parking ring 150, which is operated together with the parking rod 163, is identical to the parking ring described in the first exemplary embodiment.

The operation of the parking mechanism for estimating motor characteristics is shown in FIGS. 8A to 8C, and a principle of estimating motor characteristics is identical to that in the first exemplary embodiment except for a difference in movement of the driving rod.

That is, in the initial state (FIG. 8A) in which the rotation of the parking ring is not restricted, the driving rod 161 moves rearward, and as the parking rod 163 is rotated, the driving rod 161 moves to a position sufficient for restricting the parking ring 150 (FIG. 8B).

Next, the motor is operated, and the driving rod and the parking ring come into contact with each other such that the rotation of the parking ring is restricted (FIG. 8C).

When the rotation of the parking ring is restricted, only the rotatable member 170 is rotated by the motor unit, and as a result, relative displacement occurs between the rotatable member 170 and the parking ring. The torsion spring 180 is compressed because of the relative displacement, and in this case, the motor characteristics may be estimated by detecting a motor rotation angle and electric current applied to the motor.

As described above, an example including the motor, the reduction gear unit, the spindle and the like has been described through the exemplary embodiment of the present invention, but the present invention is not limited by this example, and it can be easily understood by those skilled in the art that the parking mechanism for estimating motor characteristics may be changed and implemented as other forms including a structure in which the elastic body, the parking ring, and the rotatable member are combined.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An electromechanical brake configured to detect a change in motor characteristics, the electromechanical brake comprising:
   a motor unit which rotates a driving shaft;
   a braking unit which produces braking force or cuts off the braking force in accordance with the rotation of the driving shaft;

a parking drive unit which operates a driving rod;

a parking ring which is freely and rotatably installed on the driving shaft and has catching portions formed radially;

a rotatable member which is installed on the driving shaft so as to be rotatable alone or together with the parking ring in accordance with the rotation of the driving shaft; and an elastic body which is elastically deformed in accordance with a relative displacement difference between the rotatable member and the parking ring, wherein the rotatable member has a protruding portion that protrudes radially, a restricting portion is formed on one surface of the parking ring along a movement trajectory of the protruding portion on the rotatable member, and the parking ring and the rotatable member are rotated together when the protruding portion presses the restricting portion, and wherein the parking ring is installed on the driving shaft below the rotatable member, and the restricting portion has an arc shape protruding from an upper surface of the parking ring.

2. The electromechanical brake of claim 1, wherein the protruding portion is configured as a pair of protruding portions that face each other, the restricting portion is configured as a pair of restricting portions that face each other, and the protruding portions are configured to be moved between the pair of restricting portions in accordance with the rotation of the rotatable member.

3. The electromechanical brake of claim 2, wherein one end portion of the elastic body is fixed to the protruding portion, another end portion of the elastic body is fixed to the restricting portion, and the elastic body is elastically deformed due to a relative displacement difference that occurs when the protruding portion is moved between the pair of restricting portions.

4. The electromechanical brake of claim 1, wherein one end portion of the elastic body is fixed to the parking ring, and another end portion of the elastic body is fixed to the rotatable member, such that a relative displacement difference occurs between the parking ring and the rotatable member.

5. The electromechanical brake of claim 4, wherein the elastic body is fixed to the rotatable member and the parking ring in a state in which the elastic body is in a no-load state or a compressed state.

6. The electromechanical brake of claim 1, wherein the elastic body is a torsion spring.

7. The electromechanical brake of claim 1, wherein the driving rod moves to restrict the rotation of the parking ring while coming into contact with the catching portions of the parking ring, and the rotatable member elastically deforms the elastic body while rotating alone in a state in which the rotation of the parking ring is restricted.

8. The electromechanical brake of claim 1, further comprising:

a sensor unit which detects a rotation angle and motor electric current of the motor unit.

9. The electromechanical brake of claim 1, wherein the catching portions are protrusions formed radially.

10. The electromechanical brake of claim 9, wherein each of the protrusions has a first surface and a second surface, and the first surface has a smaller area than the second surface such that the first and second surfaces collectively define a serrated shape.

11. The electromechanical brake of claim 1, wherein each of the catching portions has the same shape and size.

12. The electromechanical brake of claim 1, further comprising:

a parking rod which is hingedly coupled to the driving rod and has a slot; and a guide pin which is inserted into the slot of the parking rod and fixed to a housing.

13. The electromechanical brake of claim 12, wherein the slot has a track shape, the guide pin has a circular cross section, and a width of the slot is set such that the guide pin is not moved in a width direction.

14. The electromechanical brake of claim 1, further comprising:

a driving gear which is installed on the driving shaft; and a reduction gear unit which is connected with the driving gear.

15. The electromechanical brake of claim 1, further comprising:

a driving gear which is installed on the driving shaft; and a driven gear which is connected with the driving gear, wherein centers of the parking ring, the rotatable member, and the elastic body are installed on a shaft of the driving gear.

* * * * *